United States Patent

Nakamura

Patent Number: 5,327,954
Date of Patent: Jul. 12, 1994

[54] CUT-RESISTANT HEAVY-DUTY RADIAL TIRE

[75] Inventor: Yoichi Nakamura, Kodaira, Japan

[73] Assignee: Bridgestone Corporation, Tokyo, Japan

[21] Appl. No.: 91,185

[22] Filed: Jul. 14, 1993

[30] Foreign Application Priority Data

Jul. 24, 1992 [JP] Japan .................... 4-198047

[51] Int. Cl.$^5$ .................... B60C 9/18; B60C 9/20
[52] U.S. Cl. .................... 152/527; 152/526; 152/534; 152/535
[58] Field of Search .................... 152/534–535, 152/526–527

[56] References Cited

U.S. PATENT DOCUMENTS

| | | | |
|---|---|---|---|
| 3,175,598 | 3/1965 | Cegnar | 152/535 |
| 3,643,723 | 2/1972 | Mukai et al. | 152/535 X |
| 3,874,436 | 4/1975 | Hashida et al. | |
| 4,194,548 | 3/1980 | Roger | 152/535 X |
| 4,215,736 | 8/1980 | Herbelleau | |
| 4,526,217 | 7/1985 | Maeda et al. | 152/534 X |
| 4,881,587 | 11/1989 | Kabe et al. | 152/534 |
| 4,936,366 | 6/1990 | Monnot et al. | |
| 4,989,659 | 2/1991 | Nakamura et al. | |
| 5,261,475 | 11/1993 | Yoshino et al. | 152/534 X |

FOREIGN PATENT DOCUMENTS

| | | | |
|---|---|---|---|
| 2512747 | 3/1983 | France | |
| 3200403 | 9/1991 | Japan | 152/526 |
| 4-11503 | 1/1992 | Japan | 152/526 |
| 87863 | 5/1991 | Luxembourg | |

Primary Examiner—Michael W. Ball
Assistant Examiner—Adrienne C. Johnstone
Attorney, Agent, or Firm—Oliff & Berridge

[57] ABSTRACT

A heavy-duty radial tire including a carcass and four steel cord belts bearing most of stress of the tire. The carcass and the belts cross each other. An outer side belt layer of two belt layers of different cord diameters which are defined by the belts being divided into the two belt layers, the outer side belt layer being a belt layer of the two belt layers which is disposed at an outer circumferential side of the tire in a radial direction thereof; and an inner side belt layer disposed further toward an inner circumferential side of the tire in the radial direction thereof than the outer side belt layer. A difference between belt cord angles of respective belts of the outer side belt layers is less than or equal to 5°. A difference between belt cord angles of respective belts of the inner side belt layers is less than or equal to 5°. Further, $1 < \Phi\,\text{out}/\Phi\,\text{in} \leq 2.5$, and $\alpha\,\text{in} - \alpha\,\text{out} \geq 5°$ and $(\alpha\,\text{out} + \alpha\,\text{in})/2 \leq 23°$, wherein: $\Phi\,\text{out}$ = belt cord diameter of the outer side belt layer; $\alpha\,\text{out}$ = average value of absolute values of belt cord angles, defined by an equatorial plane of the tire, of the outer side belt layers; $\Phi\,\text{in}$ = belt cord diameter of the inner side belt layer; and $\alpha\,\text{in}$ = average value of absolute values of belt cord angles, defined by the equatorial plane of the tire, of the inner side belt layers.

16 Claims, 8 Drawing Sheets

PRIOR ART

FIG. 8A
PRIOR ART

FIG. 8B
PRIOR ART ies first. Further, reducing

CUT-RESISTANT HEAVY-DUTY RADIAL TIRE

BACKGROUND OF THE INVENTION

1. Field of the Invention

The present invention relates to a heavy-duty radial tire, and in particular, to a heavy-duty radial tire which is used for a vehicle which often travels on bad roads.

2. Description of the Related Art

Conventionally, heavy-duty radial tires, and in particular, heavy-duty radial tires used on bad roads, are easily cut when the tires travel over relatively sharp protrusions such as rocks or the like. The cut may extend to the belt layer which is disposed at an inner side in the radial direction of the tire of the tread rubber layer, thereby resulting in so-called cut separation, in which a separation forms between the tread rubber layer and the belt layer, or so-called cut through, in which the cut tears from the outer layer which was cut by the protrusion and penetrates through.

Figure 6:
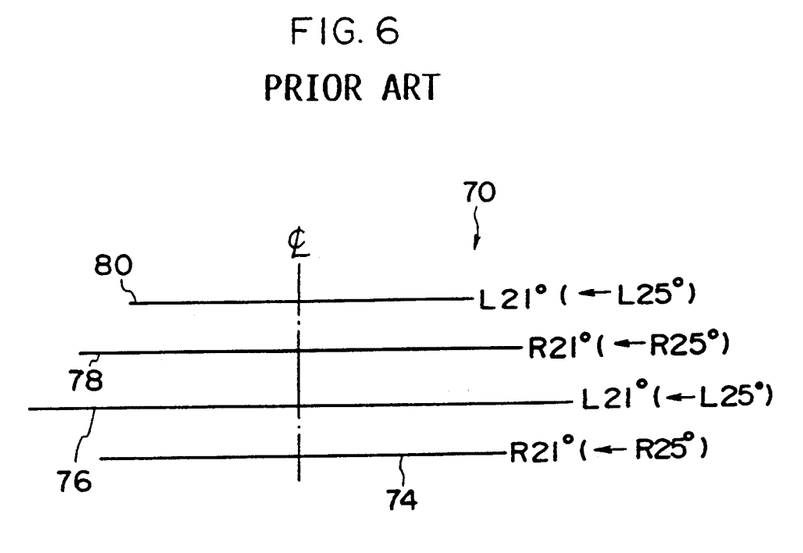
FIG. 6 is a schematic sectional view along an axial direction of a tire illustrating belt layers of a heavy-duty radial tire relating to a conventional example.

A method of preventing these cuts is known in which, as illustrated in FIG. 6, the angles, which are defined by the equatorial plane of the tire, of respective cords of a first belt layer 74, a second belt layer 76, a third belt layer 78, and a fourth belt tire 80 of a heavy-duty radial tire 70 are made small, e.g., the angles are changed from 25° to 21°. The expansion of the outer diameter of the heavy-duty radial tire 70 is suppressed, rigidity in the circumferential direction is increased, and circumferential direction shearing distortion on the belt is decreased. Further, a method is known of using thick steel cords in the belt layer so as to increase the tearing resistance, which is proportionate to the cord diameter. These methods of uniformly thickening the cord diameters of the entire belt and uniformly decreasing the belt angles defined by the equatorial plane of the tire in order to avoid an excessive concentration of distortion are used in conventional cut resistant structures of belt layers.

However, in conventional heavy-duty radial tires utilizing these types of methods, the methods are effective in dealing with defects caused by gradual tearing from the outer belt layer due to relatively sharp protrusions. However, on rough roads, the vehicle frequently travels over such relatively sharp protrusions.

Figure 7:
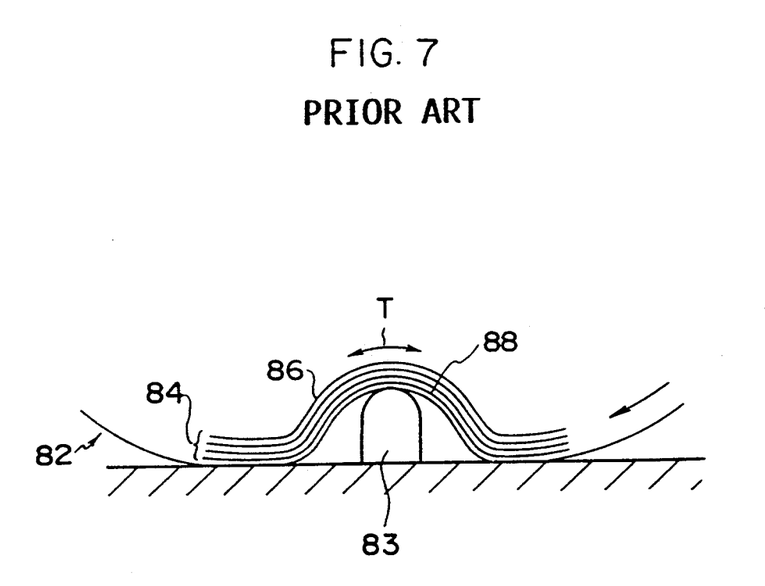
FIG. 7 is a schematic explanatory view illustrating the application of circumferential direction tensile force to belt layers of a heavy-duty radial tire relating to a conventional example.

In such a case, as illustrated in FIG. 7, an entire belt layer 84 of a heavy-duty radial tire 82 is subject to bending deformation in the circumferential direction due to a relatively sharp protrusion 83. As a result, the circumferential direction tensile force T of an inner layer belt 86 at the inner side of the belt layer 84 increases, resulting in the inner belt layer 86 tearing before a belt 88 of the outer layers. The tear extends throughout the entire belt layer 84 at once, leading to a so-called cut burst defect.

Figure 8A:
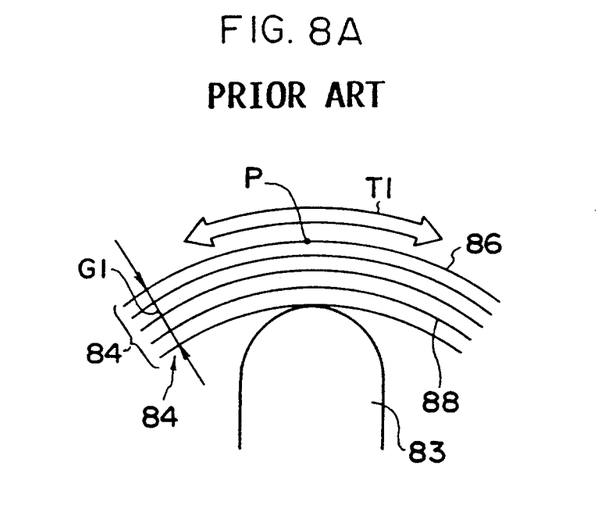
FIG. 8A is a schematic explanatory view illustrating the application of circumferential direction tensile force to belt layers of a thin heavy-duty radial tire relating to a conventional example.
Figure 8B:
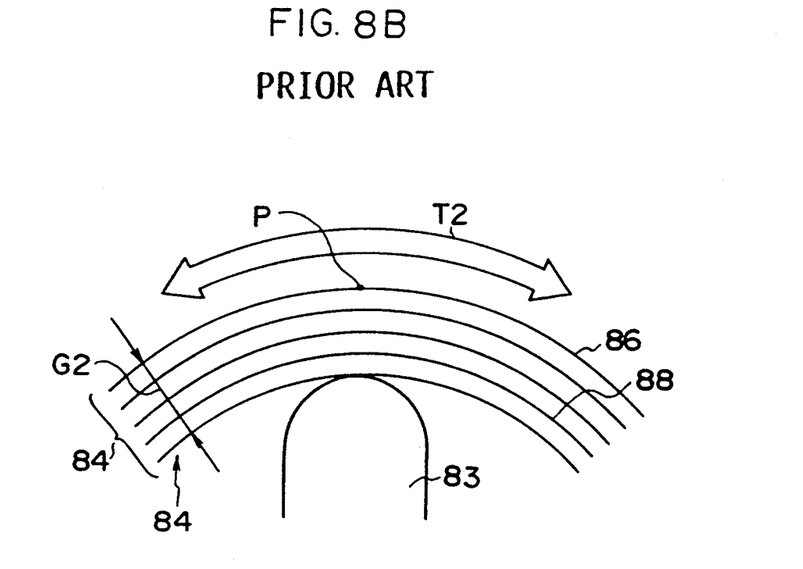
FIG. 8B is a schematic explanatory view illustrating the application of circumferential direction tensile force to belt layers of a thick heavy-duty radial tire relating to a conventional example.

Further, as illustrated in FIGS. 8A and 8B, when the total gauge of the belt layer 84 is changed from G1 to G2 due to the use of thick cords, the inner layer tensile force T2 in the circumferential direction increases proportionately to the total gauge in comparison to T1 when the tire is subject to bending deformation in the circumferential direction due to the relatively sharp protrusion 83. Therefore, tearing of the inner belt layer 86 begins at a point P and immediately causes a cut burst defect. Namely, when thick cords are used, the total gauge of the belt layer becomes thicker. Therefore, thick cords are disadvantageous with respect to defects in which the inner layer tears first. Further, reducing the belt angles defined by the equatorial plane of the tire is also disadvantageous for defects in which the circumferential direction tensile force increases and the inner layer tears first due to a sharp protrusion.

SUMMARY OF THE INVENTION

In view of the aforementioned, an object of the present invention is to provide a heavy-duty radial tire in which cut resistance of belt layers is improved.

The present invention is a heavy-duty radial tire including a carcass formed of a single layer of steel cord, and at least four belts formed from steel cords and bearing most of stress of the tire, wherein the carcass and the at least four belts are disposed so as to cross each other. The heavy-duty radial tire also includes: an outer side belt layer of two belt layers of different cord diameters which are defined by the at least four belts being divided into the two belt layers, the outer side belt layer being a belt layer of the two belt layers which is disposed at an outer circumferential side of the tire in a radial direction of the tire; and an inner side belt layer disposed further toward an inner circumferential side of the tire in the radial direction of the tire than the outer side belt layer. The at least four belts are provided such that, when a belt cord diameter of the outer side belt layer is $\Phi$ out, an average value of absolute values of belt cord angles, which are defined by an equatorial plane of the tire, of the outer side belt layers is $\alpha$ out, a belt cord diameter of the inner side belt layer is $\Phi$ in, and an average value of absolute values of belt cord angles, which are defined by the equatorial plane of the tire, of the inner side belt layers is $\alpha$ in, a difference between belt cord angles of respective belts of the outer side belt layers is less than or equal to 5°, and a difference between belt cord angles of respective belts of the inner side belt layers is less than or equal to 5°, and $1 < \Phi$ out$/\Phi$ in $\leq 2.5$, and $\alpha$ in $- \alpha$ out $\geq 5°$, and $(\alpha$ out $+ \alpha$ in$)/2 \leq 23°$.

In accordance with the present invention having the structure described above, the ratio $\Phi$ out$/\Phi$ in of the belt cord diameter $\Phi$ out of the outer side belt layer to the belt cord diameter $\Phi$ in of the inner side belt layer is such that $1 < \Phi$ out$/\Phi$ in $\leq 2.5$. The outer side belt layer has thick cords as compared with the cords of the inner side belt layer. By making small the outer side belt cord angles which are defined by the equatorial plane of the tire, the expansion of the outer diameter of the tire can be restrained, and rigidity in the circumferential direction can be increased. Further, circumferential direction shearing distortion on the belt is reduced, and cut separation is suppressed. Cut through defects caused by relatively sharp protrusions can be suppressed. The inner side belt layer has thin cords so that the total gauge of the belt layer is restrained. Therefore, an increase in tensile force of the inner side belt layer due to bending deformation generated by relatively sharp protrusions can be suppressed. The phenomenon of the inner layer tearing first can be restrained, thereby preventing cut burst defects. Accordingly, cut resistance of the belt layer can be improved.

If the belt cord diameter $\Phi$ out of the outer side belt layer is less than or equal to the belt cord diameter $\Phi$ in of the inner side belt layer, the above-described effects are not achieved. If the belt cord diameter $\Phi$ out of the outer side belt layer is greater than 2.5 times the belt cord diameter $\Phi$ in of the inner side belt layer or if the belt cord diameter $\Phi$ in of the inner belt layer becomes too thin, the above effects are not achieved sufficiently. As a result, the belt cord diameters Φ in and Φ out are set so that $1 < \Phi\text{ out}/\Phi\text{ in} \leq 2.5$.

Further, when the difference between the average α out of the absolute values of the belt cord angles, defined by the equatorial plane of the tire, of the outer side belt layer and the average α in of the absolute values of the belt cord angles, defined by the equatorial plane of the tire, of the inner side belt layer is less than 5°, either α in is too small, or α out is too large. In this case, it is difficult to suppress the tensile force of the inner belt layer and the expansion of the outer diameter of the tire. As a result, the belt cord angles are set such that $\alpha\text{ in} - \alpha\text{ out} \geq 5°$.

Further, in order to obtain the optimal growth of the outer diameter of the tire, the average belt cord angle of all of the belt layers of the inner side belt layer and the outer side belt layer must be set such that $(\alpha\text{ out} + \alpha\text{ in})/2 \leq 23°$.

DESCRIPTION OF THE PREFERRED EMBODIMENTS

A first embodiment of the present invention will be described hereinafter with reference to FIGS. 1 through 3.

Figure 2:
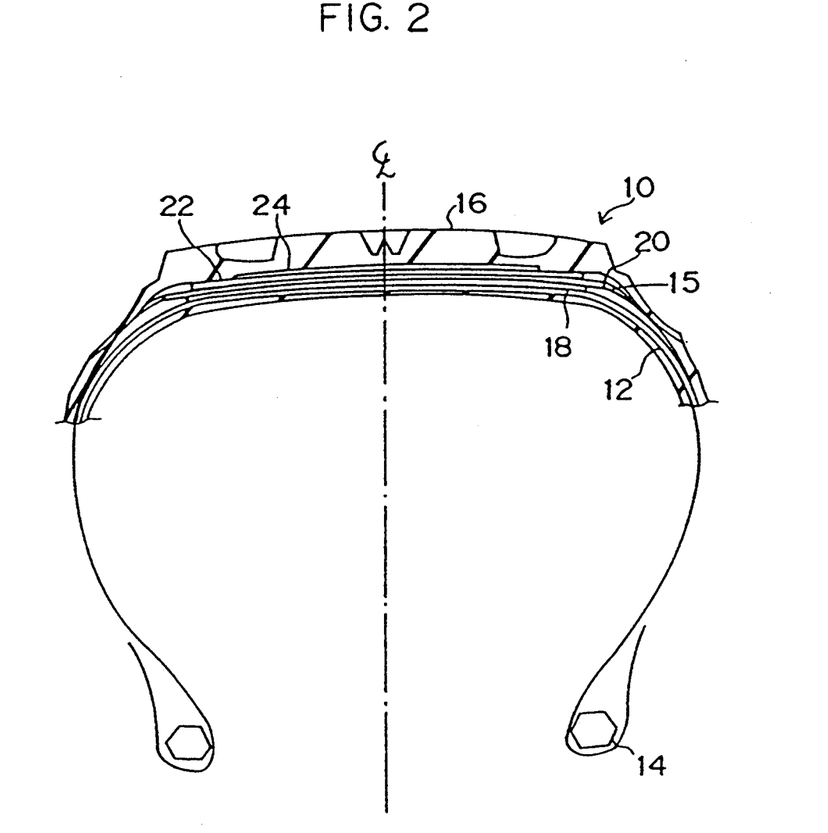
FIG. 2 is a sectional view along the axial direction of the tire illustrating an upper half of the heavy-duty radial tire relating to the first embodiment of the present invention.

As illustrated in FIG. 2, a carcass 12 of a heavy-duty radial tire 10 is formed of a layer of steel cord which extends in a toroidal shape between bead cores 14 which are disposed in a ring shape on an inner circumferential portion in the radial direction of the tire. Both end portions of the carcass 12 in the transverse direction of the tire are turned around the respective bead cores 14 from the inner side in the transverse direction of the tire toward the outer side in the transverse direction of the tire.

A belt layer 15 is disposed on the outer side of the carcass 12 in the radial direction of the tire. A tread rubber layer 16 formed of thick rubber is disposed on the outer side of the belt layer 15 in the radial direction of the tire.

Figure 1:
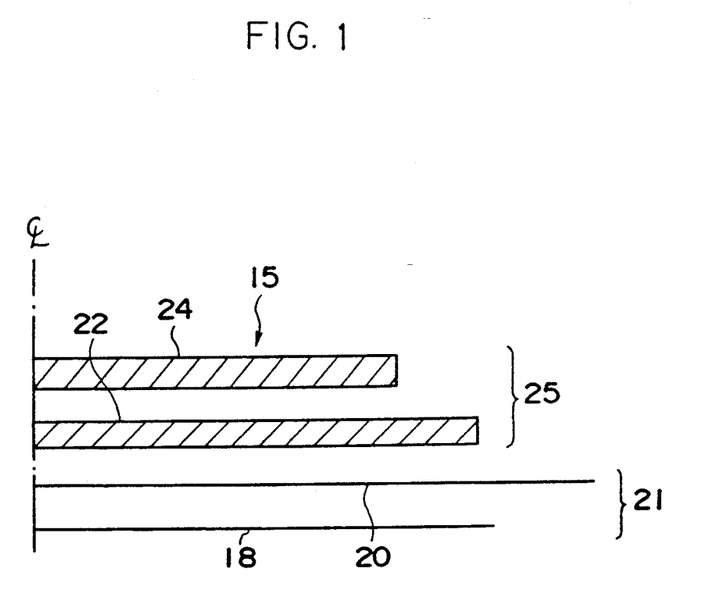
FIG. 1 is a schematic sectional view along an axial direction of a tire illustrating belt layers of a heavy-duty radial tire relating to a first embodiment of the present invention.

As illustrated in FIG. 1, the belt layer 15 is formed from four belt layers. A first belt layer 18 is disposed at the innermost area of the belt layer 15 in the radial direction of the tire. A second belt layer 20 is disposed at an outer side of the first belt layer 18 in the radial direction of the tire. Both end portions of the second belt layer 20 in the transverse direction of the tire are provided further outwardly in the transverse direction of the tire (i.e., wider) than both end portions of the first belt layer 18 in the transverse direction of the tire. Further, in the present embodiment, the first belt layer 18 and the second belt layer 20 are defined as an inner side belt layer 21.

A third belt layer 22 is disposed on an outer side of the second belt layer 20 in the radial direction of the tire. Both end portions of the third belt layer 22 in the transverse direction of the tire are provided further inwardly in the transverse direction of the tire (i.e., narrower) than both end portions of the second belt layer 20. A fourth belt layer 24 is disposed at the outer side of the third belt layer 22 in the radial direction of the tire. Both end portions of the fourth belt 24 in the transverse direction of the tire are provided further inwardly (i.e., narrower) than both end portions of the third belt layer 22 in the transverse direction of the tire. In the present embodiment, the third belt layer 22 and the fourth belt layer 24 are defined as an outer side belt layer 25.

The width of each belt layer is not limited in the present embodiment.

Figure 3:
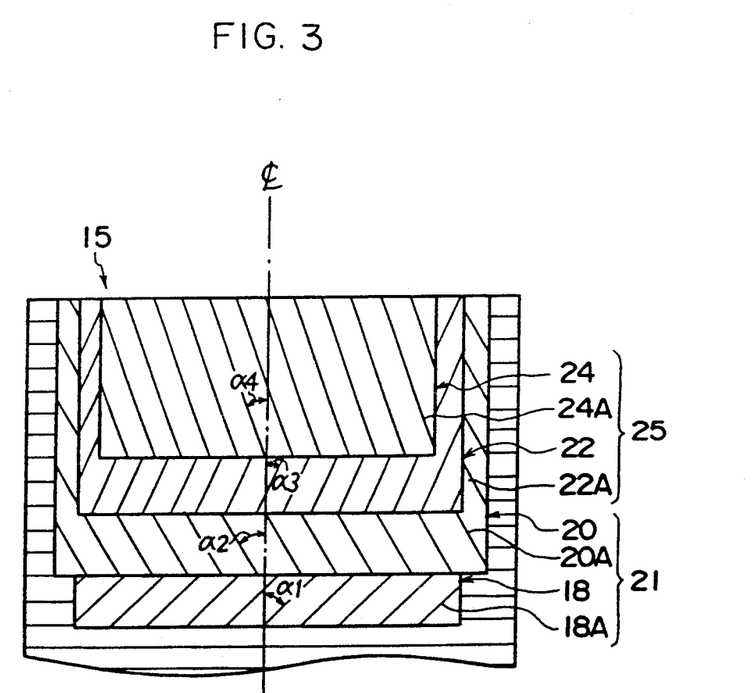
FIG. 3 is a schematic plan view illustrating the belt layers of the heavy-duty radial tire relating to the first embodiment of the present invention.

As illustrated in FIG. 3, cords 18A of the first belt layer 18 are inclined toward the right at an angle α1 with respect to the equatorial plane of the tire. Cords 20A of the second belt layer 20 are inclined to the left at an angle α2 with respect to the equatorial plane of the tire. Further, cords 22A of the third belt layer 22 are inclined to the right at an angle α3 with respect to the equatorial plane of the tire. Cords 24A of the fourth belt layer 24 are inclined to the left at an angle of α4 with respect to the equatorial plane of the tire.

Accordingly, the belt layers of the belt layer 15 which substantially bear the tensile force, i.e., the first belt layer 18, the second belt layer 20, the third belt layer 22 and the fourth belt layer 24 in the present embodiment, are disposed such that the respective cords of adjacent belt layers are inclined in different directions with respect to the equatorial plane of the tire. Namely, the cords are alternately inclined to the left and the right.

Further, when the belt cord diameter of the third belt layer 22 and the fourth belt layer 24 which are the outer side belt layer 25 is Φ out, the average of the absolute values of the belt cord angles, which are defined by the equatorial plane of the outer side belt layer 25 is α out, the belt cord diameter of the first belt layer 18 and the second belt layer 20 which are the inner side belt layer 21 is Φ in, and the average of the absolute values of the belt cord angles, which are defined by the equatorial plane, of the inner side belt layer 21 is α in, the difference between the respective belt cord angles is within a maximum of 5°, and 1<Φ out/Φ in≦2.5, and α in−α out≧5°, and (α out+α in)/2≦23°.

The cord angle and the cord diameter of each belt layer may be, for example, as shown in Table 1. "L" in the angle column of the table denotes that the cords are inclined toward the left side with respect to the equatorial plane, and "R" denotes that the cords are inclined to the right side with respect to the equatorial plane. "L" and "R" will be used in a similar manner throughout the other tables as well.

TABLE 1

| type of tire cord | A angle, diameter | B angle, diameter | C angle, diameter | D angle, diameter |
|---|---|---|---|---|
| 4th belt layer | L18, φ 4.5 | L20, φ 5.0 | L17, φ 4.5 | L19, φ 4.5 |
| 3rd belt layer | R18, φ 4.5 | R20, φ 5.0 | R20, φ 4.5 | R19, φ 4.5 |
| 2nd belt layer | L26, φ 3.0 | L25, φ 2.0 | L25, φ 4.0 | L25, φ 3.5 |
| 1st belt layer | R26, φ 3.0 | R25, φ 2.0 | R27, φ 4.0 | R27, φ 3.5 |

Next, operation of the present embodiment will be described.

In the heavy-duty radial tire 10 of the present embodiment, the outer side belt layer 25 has thicker cords than those of the inner side belt layer 21 and the belt cord angle of the outer side belt layer 25 which is defined by the equatorial plane of the tire is set smaller than that of the conventional art so that the ratio Φ out/Φ in of the belt cord diameter Φ out of the outer side belt layer 25 to the belt cord diameter Φ in of the inner side belt layer 21 is 1<Φ out/Φ in≦2.5. Expansion of the outer diameter of the tire can be suppressed, circumferential direction rigidity can be increased, and circumferential direction shearing distortion on the belt can be decreased. Further, the occurrence of cut separation can be restrained so that cut through defects caused by relatively sharp protrusions can be suppressed. Moreover, because the cords of the inner belt layer 21 are thin and an increase in the total gauge of the belt layer 15 is controlled, the increase in tensile force of the inner side belt layer 21 due to bending deformation generated by relatively sharp protrusions can be controlled. The inner layers are prevented from being torn first, thereby preventing cut burst defects. As a result, the cut resistance of the belt layer 15 can be improved.

If the belt cord diameter Φ out of the outer side belt layer 25 is less than or equal to the belt cord diameter Φ in of the inner side belt layer 21, the above-described effects are not achieved. If the belt cord diameter Φ out of the outer side belt layer 25 is greater than 2.5 times the belt cord diameter Φ in of the inner side belt layer 21 or if the belt cord diameter Φ in of the inner belt layer 21 becomes too thin, the above effects are not achieved sufficiently. As a result, the belt cord diameters Φ in and Φ out are set so that 1<Φ out/Φ in≦2.5.

Further, when the difference between the average α out of the absolute values of the belt cord angles, defined by the equatorial plane of the tire, of the outer side belt layer 25 and the average α in of the absolute values of the belt cord angles, defined by the equatorial plane of the tire, of the inner side belt layer 21 is less than 5°, either α in is too small, or α out is too large. In this case, it is difficult to suppress the tensile force of the inner belt layer 21 and the expansion of the outer diameter of the tire. As a result, the belt cord angles are set such that α in−αout≧5°.

Further, in order to obtain the optimal growth of the outer diameter of the tire, the average belt cord angle of all of the belt layers of the inner side belt layer 21 and the outer side belt layer 25 must be set such that (αout+αin)/2≦23°.

A second embodiment of the present invention will be described hereinafter in accordance with FIG. 4. Parts which are the same as those used in the first embodiment are denoted with the same reference numerals, and description thereof is omitted.

Figure 4:
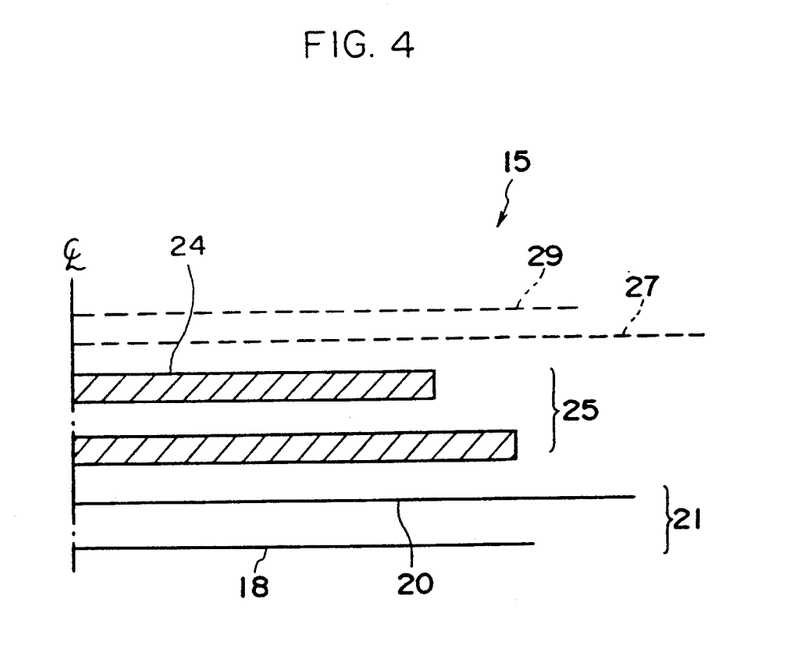
FIG. 4 is a schematic sectional view along an axial direction of a tire illustrating belt layers of a heavy-duty radial tire relating to a second embodiment of the present invention.

As illustrated in FIG. 4, in the heavy-duty radial tire of the present embodiment, a first cut protective layer 27 is disposed at an outer side in the radial direction of the tire of the fourth belt layer 24 of the belt layer 15. Both end portions of the first cut protective layer 27 in the transverse direction of the tire are provided further outwardly in the transverse direction of the tire (i.e., wider) than both end portions of the second belt layer 20 in the transverse direction of the tire. A second cut protective layer 29 is provided at an outer side of the first cut protective layer 27 in the radial direction of the tire. Both end portions of the second cut protective layer 29 in the transverse direction of the tire are provided further inwardly in the transverse direction of the tire (i.e., narrower) than both end portions of the first cut protective layer 27. The effects of the present embodiment are the same as those of the first embodiment.

The width of each belt layer is not limited in the present embodiment. The cord angles and cord diameters of the respective belt layers and cut protective layers may be, for example, as shown in Table 2.

TABLE 2

| type of tire cord | A angle, diameter | B angle, diameter | C angle, diameter | D angle, diameter |
|---|---|---|---|---|
| 2nd protective layer | R23, φ 1.9 | R23, φ 2.5 | L21, φ 2.0 | L23, φ 1.5 |
| 1st protective layer | L23, φ 1.9 | L27, φ 2.5 | R23, φ 2.0 | R23, φ 1.5 |
| 4th belt layer | L18, φ 4.5 | L20, φ 5.0 | L17, φ 4.5 | L19, φ 4.5 |
| 3rd belt layer | R18, φ 4.5 | R20, φ 5.0 | R20, φ 4.5 | R19, φ 4.5 |
| 2nd belt layer | L26, φ 3.0 | L25, φ 2.0 | L25, φ 4.0 | L25, φ 3.5 |
| 1st belt layer | R26, φ 3.0 | R25, φ 2.0 | R27, φ 4.0 | R27, φ 3.5 |

Figure 5A:
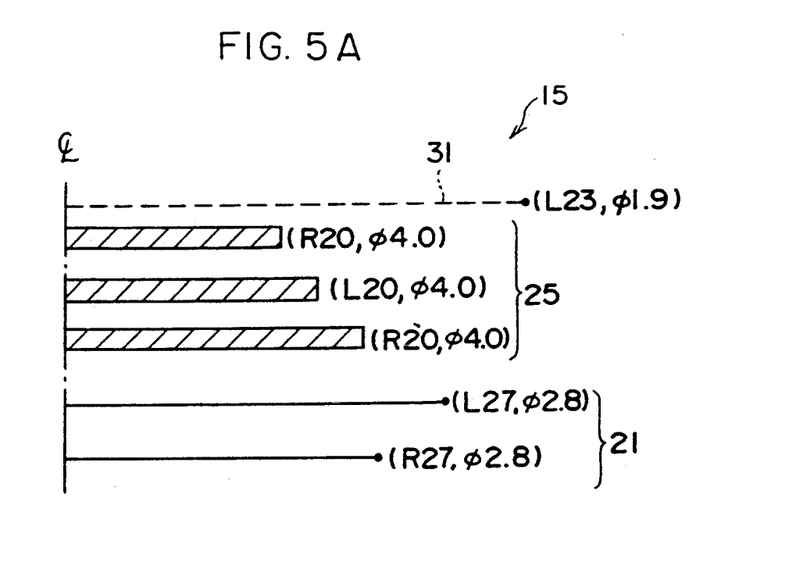
FIG. 5A is a schematic sectional view along an axial direction of a tire illustrating belt layers of a heavy-duty radial tire relating to another embodiment of the present invention.
Figure 5B:
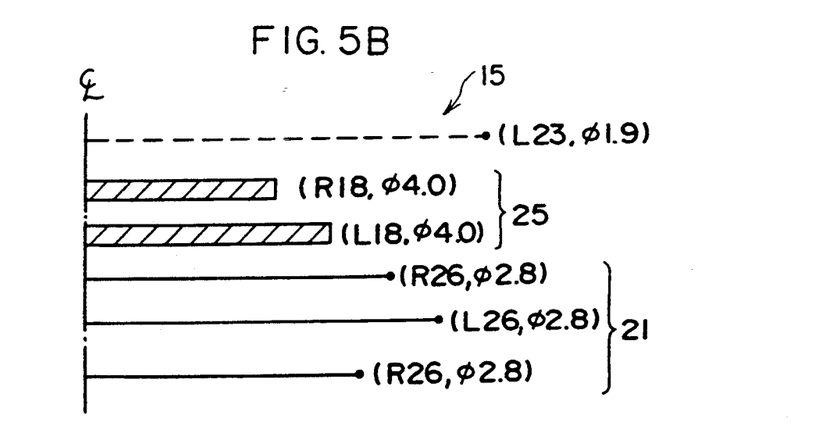
FIG. 5B is a schematic sectional view along an axial direction of a tire illustrating belt layers of a heavy-duty radial tire relating to another embodiment of the present invention.

In the first embodiment, four layers of the belt layer 15 mainly bear the stress of the tire. However, the number of belt layers is not limited to those in the above-described embodiments. As illustrated in FIG. 5A, a structure may be provided in which five belt layers mainly bear the stress of the tire. Three layers form the outer side belt layer 25, and two layers form the inner side belt layer 21. Alternatively, as illustrated in FIG. 5B, the outer side belt layer 25 may be two layers, and the inner side belt layer 21 may be three layers. There is one cut protective layer 31 in each of these examples. Further, six belt layers may mainly bear the stress of the tire. In this case, the outer side belt layer 25 may be 4, 3, or 2 layers, and the inner side belt layer 21 may be 2, 3, or 4 layers, respectively.

The heavy-duty radial tire of the present invention illustrated in FIG. 1, a heavy-duty radial tire having a conventional structure, and heavy-duty radial tires of Comparative Examples 1 through 3 were manufactured in accordance with the specifications shown in Table 3. (The size of each tire was ORR1800R25). Each tire was subject to a cut separation drum test (C/S resistance evaluation) as described below. In Table 3, the index 100 is used for the heavy-duty radial tire of the conventional structure. Larger indices are more preferable.

In the cut separation drum test, each tire was cut in four places on the circumference thereof such that the cuts reached the belt. The tire was driven on a drum at a speed of 20 km/h and at 120% of standard load. The running time which elapsed until a defect occurred was measured, and the value of the measurement was evaluated.

Next, each tire was subject to a cutter test (C/T resistance evaluation) as described hereinafter. In Table 3, the index 100 is used for the heavy-duty radial tire of the conventional structure. Larger indices are more preferable.

In the cutter test, a relatively sharp cutter blade (height 200 mm, included angle 60°) was used. For each tire, the cutter blade was placed at a position directly beneath the load direction of the tire. The tire was made to run over the cutter blade so that the cutter blade penetrated the belt layer. The maximum load at the time of penetration was measured, and the value of the measurement was evaluated.

Next, each tire was subject to a plunger test (C/B resistance evaluation) as described below. In Table 3, the index 100 is used for the heavy-duty radial tire of the conventional structure. Larger indices are more preferable.

A protrusion having a rounded tip was used in the plunger test. (The entire height of the protrusion was 200 mm, and the hemispherical tip end thereof had a radius of 25 mm). For each tire, the protrusion was placed at a position directly beneath the load direction of the tire. The tire was made to run over the protrusion so that the protrusion penetrated the belt layer. The maximum load at the time of penetration was measured, and the value of the measurement was evaluated.

TABLE 3

| type of tire cord | conventional example angle, diameter | comparative example 1 angle, diameter | comparative example 2 angle, diameter | comparative example 3 angle, diameter | embodiment angle, diameter |
|---|---|---|---|---|---|
| 4th belt layer | L23, $\phi$ 2.5 | L21, $\phi$ 4.0 | L23, $\phi$ 4.0 | L20, $\phi$ 2.5 | L20, $\phi$ 4.0 |
| 3rd belt layer | R23, $\phi$ 2.5 | R21, $\phi$ 4.0 | R23, $\phi$ 4.0 | R20, $\phi$ 2.5 | R20, $\phi$ 4.0 |
| 2nd belt layer | L23, $\phi$ 2.5 | L21, $\phi$ 4.0 | L23, $\phi$ 2.0 | L25, $\phi$ 2.5 | L25, $\phi$ 2.5 |
| 1st belt layer | R23, $\phi$ 2.5 | R21, $\phi$ 4.0 | R23, $\phi$ 2.0 | R25, $\phi$ 2.5 | R25, $\phi$ 2.5 |
| C/S resistance | 100 | 130 | 100 | 130 | 130 |
| C/T resistance | 100 | 140 | 140 | 100 | 140 |
| C/B resistance | 100 | 60 | 80 | 140 | 110 |

From the results shown in Table 3, it is clear that the heavy-duty radial tire of the present invention is superior.

What is claimed is:

1. A heavy-duty radial tire comprising:
   a carcass formed of a single layer of steel cord;
   at least four belts formed from steel cords and bearing most of stress of said tire;
   wherein said carcass and said at least four belts are disposed so as to cross each other, further comprising:
   an outer side belt layer of two belt layers of different cord diameters which are defined by said at least four belts being divided into said two belt layers, said outer side belt layer being a belt layer of said two belt layers which is disposed at an outer circumferential side of said tire in a radial direction of said tire; and
   an inner side belt layer disposed further toward an inner circumferential side of said tire in the radial direction of said tire than said outer side belt layer;
   wherein said at least four belts are provided such that, when a belt cord diameter of said outer side belt layer is $\Phi$ out, an average value of absolute values of belt cord angles, which are defined by an equatorial plane of said tire, of said outer side belt layers is $\alpha$ out, a belt cord diameter of said inner side belt layer is $\Phi$ in, and an average value of absolute values of belt cord angles, which are defined by the equatorial plane of said tire, of said inner side belt layers is $\alpha$ in,
   a difference between belt cord angles of respective belts of said outer side belt layers is less than or equal to 5°, and a difference between belt cord angles of respective belts of said inner side belt layers is less than or equal to 5°, and $1 < \Phi$ out$/\Phi$ in $\leq 2.5$, and $\alpha$ in$-\alpha$ out$\geq 5°$, and $(\alpha$ out$+\alpha$ in$)/2 \leq 23°$.

2. A heavy-duty radial tire according to claim 1, wherein absolute values of respective belt cord angles of said belts which form said outer side belt layer are equal, and absolute values of respective belt cord angles of said belts which form said inner side belt layer are equal.

3. A heavy-duty radial tire according to claim 2, wherein the absolute values of the respective belt cord angles of said belts of said outer side belt layer are in a range of 17° to 20°.

4. A heavy-duty radial tire according to claim 2, wherein the absolute values of the respective belt cord angles of said belts of said inner side belt layer are in a range of 25° to 27°.

5. A heavy-duty radial tire according to claim 1, wherein at least one of absolute values of respective belt cord angles of said belts which form said outer side belt layer and absolute values of respective belt cord angles of said belts which form said inner side belt layer are different.

6. A heavy-duty radial tire according to claim 5, wherein the absolute values of the respective belt cord angles of said belts of said outer side belt layer are in a range of 17° to 20°.

7. A heavy-duty radial tire according to claim 5, wherein the absolute values of the respective belt cord angles of said belts of said inner side belt layer are in a range of 25° to 27°.

8. A heavy-duty radial tire according to claim 1, wherein a belt cord diameter of said inner side belt layer is in a range of 2 millimeters to 4 millimeters.

9. A heavy-duty radial tire according to claim 1, wherein a belt cord diameter of said outer side belt layer is in a range of 4.5 millimeters to 5 millimeters.

10. A heavy-duty radial tire according to claim 1, further comprising:
   at least one cut protective layer disposed at an outer circumferential side, in the radial direction of said tire, of said outer side belt layer.

11. A heavy-duty radial tire comprising:
   a carcass formed of a single layer of steel cord;
   at least four belts formed from steel cords and bearing most of stress of said tire;
   at least one cut protective layer disposed at an outer circumferential side, in a radial direction of said tire, of said at least four belts;
   wherein said carcass, said at least four belts, and said at least one cut protective layer are disposed so as to cross each other, further comprising:
   an outer side belt layer of two belt layers of different cord diameters which are defined by said at least four belts being divided into said two belt layers, said outer side belt layer being a belt layer of said two belt layers which is disposed at an outer circumferential side of said tire in a radial direction of said tire; and
   an inner side belt layer disposed further toward an inner circumferential side of said tire in the radial direction of said tire than said outer side belt layer;
   wherein said at least four belts are provided such that, when a belt cord diameter of said outer side belt layer is $\Phi$ out, an average value of absolute values of belt cord angles, which are defined by an equatorial plane of said tire, of said outer side belt layers is $\alpha$ out, a belt cord diameter of said inner side belt layer is $\Phi$ in, and an average value of absolute values of belt cord angles, which are defined by the equatorial plane of said tire, of said inner side belt layers is $\alpha$ in,
   a difference between belt cord angles of respective belts of said outer side belt layers is less than or equal to 5°, and a difference between belt cord angles of respective belts of said inner side belt layers is less than or equal to 5°, and the absolute values of the respective belt cord angles of said belts of said outer side belt layer are in a range of 17° to 20° and the absolute values of the respective belt cord angles of said belts of said inner side belt layer are in a range of 25° to 27°, and a belt cord diameter of said inner side belt layer is in a range of 2 millimeters to 4 millimeters, and a belt cord diameter of said outer side belt layer is in a range of 4.5 millimeters to 5 millimeters, and $1 < \Phi$ out$/\Phi$ in $\leq 2.5$, and $\alpha$ in$-\alpha$ out$\geq 5°$, and ($\alpha$ out$+\alpha$ in)$/2 \geq 23°$.

12. A heavy-duty radial tire according to claim 11, wherein absolute values of respective belt cord angles of said belts which form said outer side belt layer are equal, and absolute values of respective belt cord angles of said belts which form said inner side belt layer are equal.

13. A heavy-duty radial tire according to claim 11, wherein at least one of absolute values of respective belt cord angles of said belts which form said outer side belt layer and absolute values of respective belt cord angles of said belts which form said inner side belt layer are different.

14. A heavy-duty radial tire comprising:
   a carcass formed of a single layer of steel cord;
   at least four belts formed from steel cords and bearing most of stress of said tire;
   wherein said carcass and said at least four belts are disposed so as to cross each other, further comprising:
   an outer side belt layer of two belt layers of different cord diameters which are defined by said at least four belts being divided into said two belt layers, said outer side belt layer being a belt layer of said two belt layers which is disposed at an outer circumferential side of said tire in a radial direction of said tire; and
   an inner side belt layer disposed further toward an inner circumferential side of said tire in the radial direction of said tire than said outer side belt layer;
   wherein said at least four belts are provided such that, when a belt cord diameter of said outer side belt layer is $\Phi$ out, an average value of absolute values of belt cord angles, which are defined by an equatorial plane of said tire, of said outer side belt layers is $\alpha$ out, a belt cord diameter of said inner side belt layer is $\Phi$ in, and an average value of absolute values of belt cord angles, which are defined by the equatorial plane of said tire, of said inner side belt layers is $\alpha$ in,
   a difference between belt cord angles of respective belts of said outer side belt layers is less than or equal to 5°, and a difference between belt cord angles of respective belts of said inner side belt layers is less than or equal to 5°, and the absolute values of the respective belt cord angles of said belts of said outer side belt layer are in a range of 17° to 20° and the absolute values of the respective belt cord angles of said belts of said inner side belt layer are in a range of 25° to 27°, and a belt cord diameter of said inner side belt layer is in a range of 2 millimeters to 4 millimeters, and a belt cord diameter of said outer side belt layer is in a range of 4.5 millimeters to 5 millimeters, and $1 < \Phi$ out$/\Phi$ in $\leq 2.5$, and $\alpha$ in$-\alpha$ out$\geq 5°$, and ($\alpha$ out$+\alpha$ in)$/2 \geq 23°$.

15. A heavy-duty radial tire according to claim 14, wherein absolute values of respective belt cord angles of said belts which form said outer side belt layer are equal, and absolute values of respective belt cord angles of said belts which form said inner side belt layer are equal.

16. A heavy-duty radial tire according to claim 14, wherein at least one of absolute values of respective belt cord angles of said belts which form said outer side belt layer and absolute values of respective belt cord angles of said belts which form said inner side belt layer are different.

* * * * *